Figure 1:
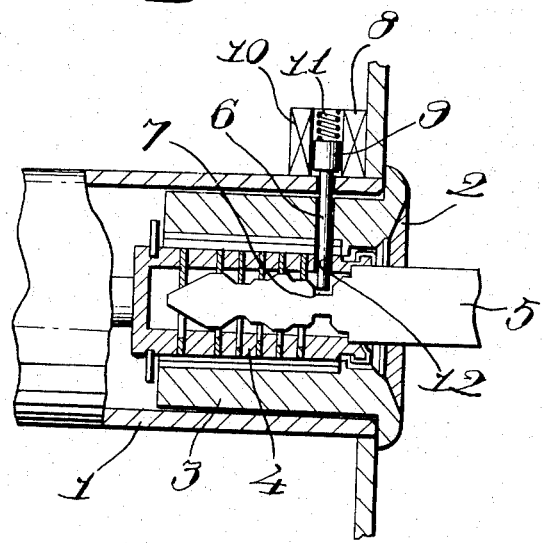

United States Patent [19]
Suzuki

[11] 3,708,032
[45] Jan. 2, 1973

[54] ACCIDENTAL LOCK PREVENTING DEVICE
[75] Inventor: Masaru Suzuki, Hekikai-gun, Aichi-ken, Japan
[73] Assignee: Kabushiki Kaisha Tokai Rika Denki Seisakusho, Aichi-ken, Japan
[22] Filed: Nov. 19, 1970
[21] Appl. No.: 91,109

[30] Foreign Application Priority Data
Nov. 24, 1969 Japan.................................44/94061

[52] U.S. Cl.........................180/114, 70/252, 70/389
[51] Int. Cl..........................B60r 25/02, E05b 65/12
[58] Field of Search.........180/103, 114; 70/389, 252

[56] References Cited
UNITED STATES PATENTS

| 2,229,525 | 1/1941 | Sandberg | 70/252 |
|---|---|---|---|
| 2,913,894 | 11/1959 | Gieray et al. | 70/252 X |
| 3,119,458 | 1/1964 | Fritz | 180/114 |
| 3,303,836 | 2/1967 | Burleigh | 180/114 X |
| 3,426,560 | 2/1969 | Dwan | 180/114 |
| 3,490,255 | 1/1970 | Wight et al. | 70/252 |
| 3,595,039 | 7/1971 | Juy | 70/252 |

Primary Examiner—Robert J. Spar
Attorney—Shlesinger, Fitzsimmons & Shlesinger

[57] ABSTRACT

A device is provided for preventing accidental locking of the steering shaft of a motor vehicle of the type having an ignition lock, operable by rotation of an ignition key. A locking bolt, which is engageable with the steering shaft only upon the rotation of the ignition lock to ignition-off position, and withdrawal of the key from the ignition lock, is prevented from engaging the steering shaft during the running of the vehicle by means which is electrically actuated and which will permit withdrawal of the key from the ignition lock only upon the halting of the vehicle.

11 Claims, 6 Drawing Figures

INVENTOR.
Masaru Suzuki

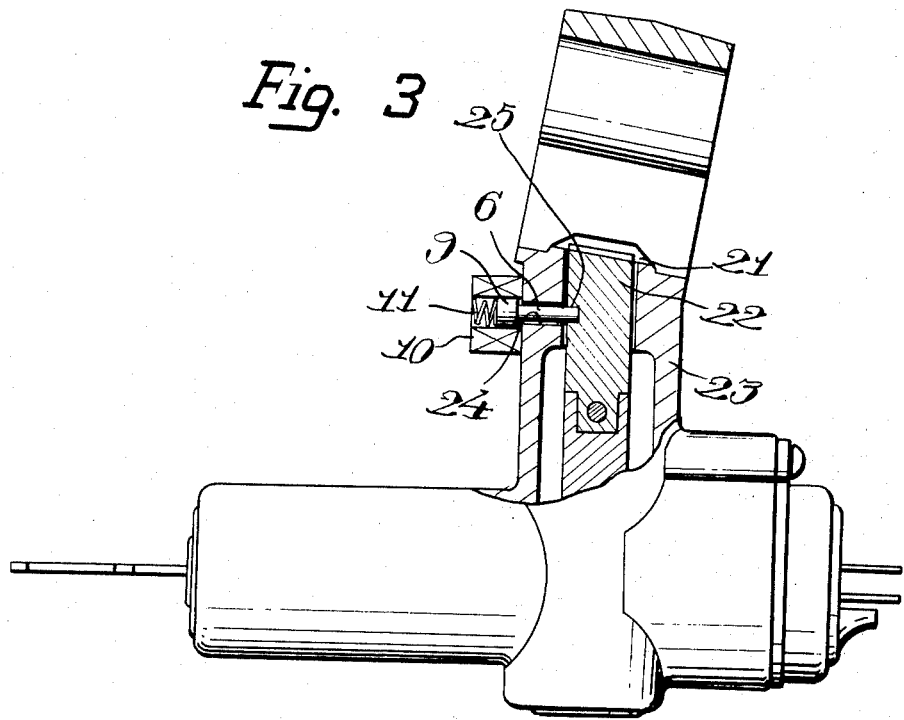
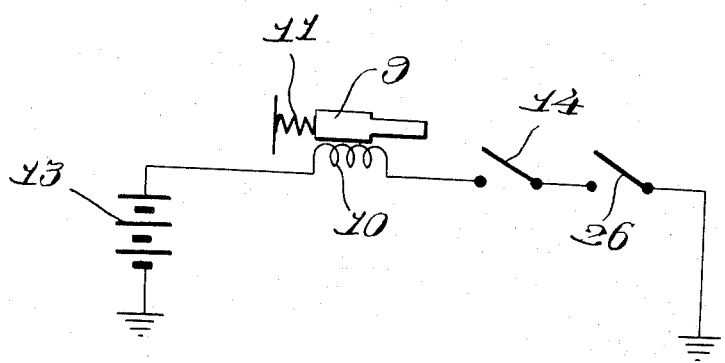

INVENTOR.
Masaru Suzuki
BY
Shlesinger, Fitzsimmons & Shlesinger
Attorneys

ACCIDENTAL LOCK PREVENTING DEVICE

This invention relates to an accidental lock preventing device for automobiles, and more particularly it relates to a device for preventing an accidental actuation of a locking bolt in a steering shaft locking device for automobiles.

There have been proposed a number of steering shaft locking devices for automobiles in which as the result of the rotation of a rotor accommodated within a lock cylinder by a key inserted in the rotor, the ignition circuit of the motor vehicle is settable in various positions, such as a stop, drive and start position by means of a movable contact operable in connection with the rotation of the rotor. The locking device includes a locking bolt and an actuating or controlling member which holds said locking bolt in a retracted position, during operation of the vehicle's engine, against the resistance of an actuating spring which urges said bolt toward locking position. Upon the rotation of rotor to its off position and withdrawal of the key from the rotor, this spring urges the bolt into locking engagement the steering shaft and preventing the manipulation of steering wheel. The principal object of the steering shaft locking device of the present invention is to prevent the locking bolt from being brought into locking engagement with the steering shaft when the key inserted into the rotor is rotated by mistake or by accident to stop position during motion of the vehicle, thereby to prevent an accident which might happen as the result of the inability to rotate the steering wheel on account of accidental locking engagement of the locking bolt with the steering shaft.

By means of such steering shaft locking devices having constructions as stated above, it is possible to prevent the accidental locking engagement of a locking bolt with the steering shaft even when the key and rotor are accidentally rotated to the stop or locking position, and to keep the vehicle under the control of a driver even in such instance. However should the key be rotated by accident or by mistake to the stop or locking position and then be withdrawn from the rotor unfortunately, the locking bolt will engage the steering shaft and the driver will lose control of the vehicle.

While it is likely to be very rare that a key inserted into the rotor and rotated and kept in a drive position, happens to be rotated accidentally to a stop position and be withdrawn from the rotor, nobody can say that such accidental movement of the key will never happen. Such movement of the key is expected to happen, for example, through mischief by a child or a shock given to the key on a collision of vehicles. Especially in case of a comparatively light collision which causes the rotation and falling-off of key and the accidental locking engagement of the lock bolt with the steering shaft, one could have managed to drive his vehicle after the collision so as to avert succeeding collisions and to keep the damage arising from the first collision at a minimum, if he had not lost control of the vehicle on account of the accidental locking engagement of the lock bolt with the steering shaft upon the collision.

In view of the above, it is most desirable to provide a steering shaft locking device for a motor vehicle with an accidental lock preventing device which can positively prevent the accidental falling-off of the key from the rotor, and by provision of which a driver shall never lose control of the vehicle during its running. Such accidental lock preventing device can be made by either employing structures by which the running of a motor vehicle is electrically sensed and a locking bolt is not engageable with the steering shaft of a vehicle while it runs, or constructions in which a key inserted into a rotor for the operation of the electric circuit of vehicle and locking bolt can not be withdrawn from the ignition lock rotor by the conventional manual operation thereof, viz., the manual rotation and succeeding withdrawal of the key from the rotor, which often is made in a single operation, by instinct. The present invention is based on the conception involved in the first-mentioned structures, which positively prevent a locking bolt from engaging a steering shaft while the vehicle runs. More in detail, the present invention consists in an accidental lock preventing device in a steering shaft locking device for a motor vehicle of the kind in which the ignition circuit of the vehicle is settable in various positions such as a stop, drive and start position by rotation of a rotor accommodated within a lock cylinder and operable by a key inserted thereinto and, in which only upon the rotation of the rotor to said stop position and withdrawal of the key from the rotor, will a locking bolt be urged to its protruding position for locking engagement with the steering shaft thereby preventing manipulation of the steering wheel. Such device electrically senses the running of the vehicle and allows the locking bolt to make locking engagement with the steering shaft only after the vehicle has stopped.

Accordingly, it is an object of the present invention to provide; in a steering shaft locking device of the character described an accident preventing device comprising electrically actuated means which can prevent either the withdrawal of the key from the rotor or the projection of the locking bolt into the steering shaft during the running of the vehicle, by sensing the running of the vehicle, whereby the locking engagement of the locking bolt with the steering shaft during the driving of the vehicle is positively prevented.

It is another object of the present invention to provide an accidental lock preventing device of the kind mentioned above with means which make the aforementioned electrically actuated means inactive when the steering shaft locking device has been actuated.

Other objects and detailed constructions of the present invention will be apparent from the following description when read in conjunction with the accompanying drawings in which preferred embodiments of the present invention are illustrated.

Figure 2:
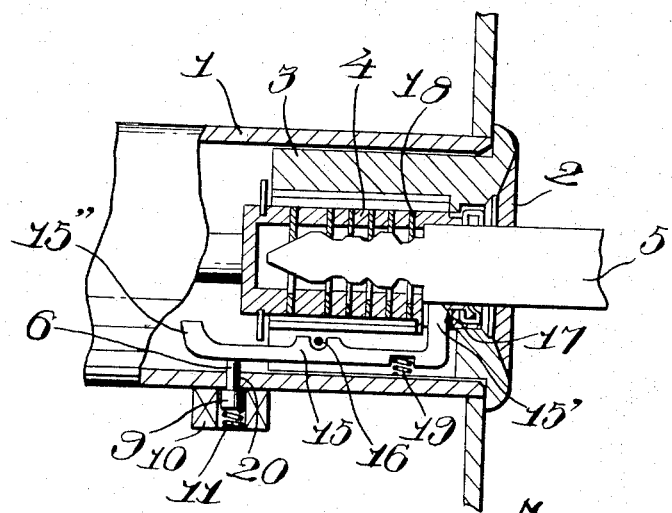
Figure 4:
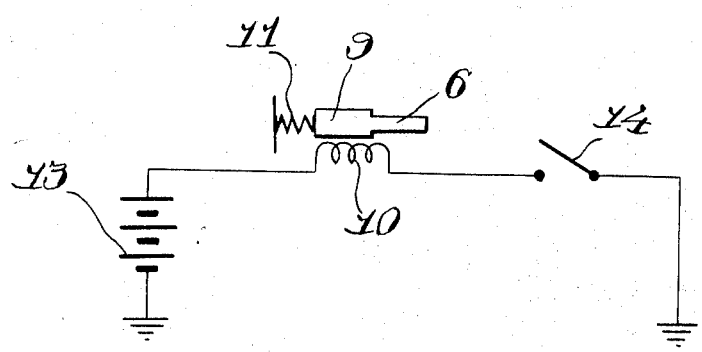
Figure 5:
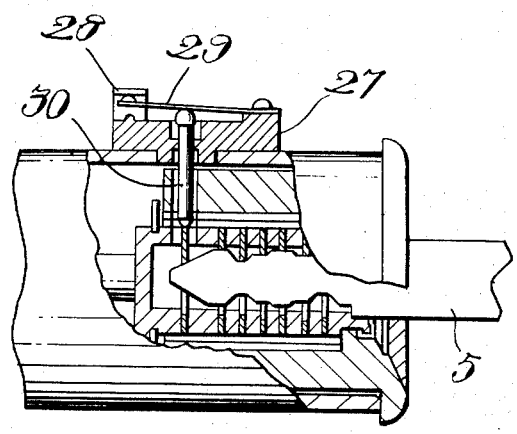

In the accompanying drawings;

FIG. 1 is a side elevational view, partly cut away, of a principal part of a steering shaft locking device incorporating the present invention, FIG. 2 is a view similar to FIG. 1, but illustrating a modified device which acts indirectly on the key, FIG. 3 is a side elevational view, partly cut away, of another device for preventing the accidental locking engagement of the locking bolt with the steering shaft, FIG. 4 is a wiring diagram illustrating one manner of wiring the embodiments which are illustrated in FIGS. 1 to 3, FIG. 5 is a fragmentary side elevational view, partly cut away, of means for rendering the devices shown in FIGS. 1 to 3 inactive after the vehicle has been halted, and FIG. 6 is wiring diagram illustrating one manner of wiring the device illustrated in FIG. 5.

Referring now to the accompanying drawings in which corresponding parts of the devices shown in FIGS. 1 to 6 are indicated by identical numerals, and particularly referring to FIGS. 1 and 4 first, a lock 2 of the cylinder type which is fitted within a tubular housing 1 and may be operated by a key 5, has a rotor 4 which is rotatably fitted within stationary sleeve body 3 of the lock. Adjacent to its end opposite to the open end thereof housing 1 contains a movable contact (not shown) which is directly connected to the rotor 4 by an actuating means (not shown), or indirectly through means operable in connection with the movement of the actuating means, and which can set the electrical ignition circuit of a vehicle in various positions such as a stop, drive and start position. Said actuating means, or the means operable in connection with the movement of the former, normally acts to prevent a locking bolt such as shown in FIG. 3 by numeral 22 from being moved to its protruding position where it is in locking engagement with the steering shaft of the vehicle, but allows the bolt to project to its protruding position when the rotor is rotated to the stop position, provided the key 5, the forward end of which engages directly or indirectly with the locking bolt 22 for retarding the projection of bolt even when the rotor has been rotated to its stop position, is withdrawn from the rotor. Since such constructions of theft preventing devices for motor vehicles as described above are conventional and known through prior patents, such as Japanese Pat. publication No. 34-1411 for example; a detailed explanation and illustration of such constructions are not made herein. The rotor 4 is rotatable by key 2 to specific angular distances which correspond to the aforementioned stop, drive and start positions; and the insertion and withdrawal of the key 5 into and from the rotor can be made only at the stop position thereof. These constructions are also quite conventional. Said key 5 is provided with a recess 7 which is registrable with a movable control pin 6, detailed explanation of which shall be given in the following. On a circumferential outer wall of the tubular housing 1, there is fitted a solenoid 10 provided with a plunger 9 which has at its free end the aforementioned movable control pin 6. Said plunger 9 is normally urged by a spring 11 towards the housing 1, and the movable control pin 6 is accordingly projected into the housing through a bore 12 which extends transversely to the longitudinal axis of the housing and through said housing and rotor, and is engageable with the recess 7 of key 5 when said key is in the stop position. When the solenoid 10, which is mounted on a bobbin 8, is energized, the plunger 9 is attracted by the solenoid outwardly against the spring 11, and the movable control pin 6 is disengaged from the key 5. One terminal of the solenoid 10 is connected, as illustrated in FIG. 4, to an electric source 13, and another end thereof is grounded through a switch 14 which actuates in response to the running of a motor vehicle. Said switch 14 may be any one of conventional switches of the kind, an example of which is disclosed in Japanese utility model publication No. 43-9150, provided that in the present invention, said switch is open when the vehicle is in motion or running, and is closed when the vehicle is stopped.

A steering shaft locking device of the kind mentioned above and provided with the herein disclosed accidental lock preventing device performs as follows and positively accomplishes the objects described in the foregoing.

Even in case where the key 5 is in the stop position and hence the locking bolt 22 is ready to protrude for making its locking engagement with the steering shaft upon the withdrawal of the key from the rotor, the key can not be withdrawn from the rotor and the locking engagement between the locking bolt and steering shaft can never be made, as long as the vehicle runs, because the switch 14 is kept open while the vehicle runs, and the electric circuit for energizing the solenoid 10 is hence kept open, whereby spring 11 causes the movable control pin 6 to be engaged with the key 5 at its recess 7. This means that as long as the vehicle runs, the key can not be withdrawn from the rotor either intentionally or by accident. When the vehicle stops, the switch 14 becomes closed, resulting in the solenoid circuit being closed, energizing the solenoid 10 and withdrawing the plunger 9 from the key 5 against the resiliency of spring 11. The movable control pin 6 is, thereby, disengaged from the key 5, and the key is withdrawable from the rotor, allowing the locking bolt to engage with the steering shaft. While in the embodiment illustrated in FIG. 1 and explained above, the pin 6 is engageable with the key at the recess 7, which is provided along the ridge where the key teeth are cut, it is to be noted that such a recess could be one provided at another portion of the key, such as a hole or recess provided at a lateral side of the key.

The second embodiment illustrated in FIG. 2 is more or less the same, in principle, to the one explained above in conjunction with FIGS. 1 and 4, except that the modified device is adapted to act on the key indirectly.

In the embodiment of FIG. 2 a locking bolt such as shown in FIG. 3 by numeral 22, which is urged towards a steering shaft such as shown in FIG. 3 by numeral 21, is brought, upon the rotation of rotor 4 to its stop position, to a position where it is ready to project into locking engagement with the steering shaft, but can not be projected into this position unless the key is withdrawn from the rotor. Within tubular housing 1 and in a space formed between the inner circumferential wall and the outer circumferential wall of rotor 4, there is provided a rocking lever 15 which is rockably pivoted by a pin 16 at about the longitudinal center thereof. One end 15' of the lever 15 projects into a hole 17 which is provided in the rotor at a portion where no rotor pin 18 is located. Said end 15' is urged by a spring 19 inwardly to be engageable with a key 5 inserted into the rotor. The other end 15'' of the lever 15 is made so as to be engageable with a controlling member (not shown) which controls the movement or protrusion of the locking bolt, and which prevents the locking bolt from protruding into locking engagement with the steering shaft as long as the key 5 is kept in the rotor 4. When the key is rotated to the stop position and withdrawn from the rotor, the end 15' of lever 15 projects inwardly into the rotor by the action of spring 19, resulting in rocking movement of lever 15 about the pin 16 and consequently causing the other end 15" to move downwardly from the position shown in the drawing. Such downward movement of the end 15" releases the engagement of the controlling member with the locking bolt, and consequently allows the bolt to project into locking engagement with the steering shaft. Steering shaft locking devices having key operated controlling members as described above are known, and an example of such constructions is disclosed in British Pat. No. 1,081,367. A solenoid 10, construction and electrical connections of which are similar to those explained in the first embodiment, is fixedly mounted on a circumferential outer wall of the housing 1. A movable control pin 6 projecting from the free end of plunger 9 of the solenoid normally projects into the housing through a hole 20 provided in the housing at a location adjacent to the end 15" of lever 15, and contacts with said end 15" so as to retard its downward movement.

In the second embodiment described just above, the movable control pin 6, which is urged by the spring 11 towards the end 15" of lever 15, can positively prevent the rocking lever 15 from rocking to disengage the controlling member, even when the key 5 is rotated to the stop position and is withdrawn from the rotor 4 by accident while the vehicle is running, since the switch 14 (FIG. 4) will be kept open as long as the vehicle runs and thus the circuit for energizing the solenoid 10 is concurrently kept open. Only when the vehicle stops, the switch 14 comes closed, as explained in the first embodiment, to make the closed circuit for the solenoid, so as to attract the plunger 9 and pin 6 downwardly in the drawing to release the retarding contact of the pin 6 with the end 15" of lever 15.

In FIG. 3, there is shown another embodiment of the present invention, in which the structural and functional difference from the first and second embodiments lies in that this accidental lock preventing device acts directly on the locking bolt 22 so as to allow said bolt to project into its locking position only when the vehicle is stopped.

The protrusion of the locking bolt 22 into a steering shaft 21 for locking engagement therewith and the retraction thereof from said shaft are controlled by the rotation of a key from or to its stop position, as described in connection with the first and second embodiments and with reference to FIGS. 1 and 2. Said locking bolt is accommodated within a housing 23 which extends from a tubular housing transversely to the latter. On a circumferential outer wall of said housing 23 there is fixedly mounted a solenoid 10 which comprises a plunger 9, a pin 6 and a spring 11 which are all identical to those of the first and second embodiments. The movable control pin 6 normally projects into engagement with the retracted locking bolt at recess 25 thereof through a hole 24 which extends through the wall of housing 23. The wiring circuit of solenoid 10 is same to that of the first and second embodiments, in which the circuit is kept open when the vehicle is running, and is closed only after the vehicle is stopped, to make the solenoid attract the plunger 9 and allow the locking bolt to project towards the steering shaft. It is to be understood that an advantage of this third embodiment is that it is adaptable and effective for use with a steering shaft locking device in which its locking bolt is protrusible only by the rotation of the key to the stop position and without the withdrawal of key from the rotor.

While either of the three embodiments described above can prevent an accidental engagement of the locking bolt 22 with the steering shaft 21 during the running of a vehicle, there is a drawback in that electricity from the electric source 13 of the vehicle is wasted by the solenoid 10, since the switch 14 is kept closed continuously after the stopping of vehicle and the solenoid is kept energized. In view of such drawback of the above embodiments, means which can cause the solenoid circuit to open again after the stopping of the vehicle, is desirable. An example of such means is given in FIGS. 5 and 6.

In these figures, the solenoid 10 is connected at one of its terminals to the electric source 13 and is grounded at the other end through the switch 14 and another switch 26 which are in series. Said switch 26 is opened in response to the withdrawal of key 5 from the rotor 4, and might be constructed in a manner such as shown in FIG. 5. A movable contact 29 of the switch 26 has one end supported by an insulator 27 fixedly mounted on a circumferential outer wall of the lock housing, and has a movable contact at its other end which can contact with a stationary contact 28. As long as the key 5 is held within the rotor, said movable contact is pressed upwardly by a pin 30 so that its contacts the stationary contact 28, closing the switch 26 closed. In FIG. 6, when the vehicle is running, the circuit is kept open by means of the switch 14, which is kept open when the vehicle runs, and although the other switch 26 is kept closed at this time by the key in the lock during the running of vehicle, the solenoid 10 is not energized. However, when the vehicle stops and the key is held in the rotor, the circuit is held closed and the solenoid is energized so as to allow the locking bolt either to project into locking engagement with the steering wheel, or to be brought to a position where it is projectable thereinto upon removal of the key. When the key is withdrawn from the rotor to accomplish the locking engagement between the locking bolt and steering shaft, the switch 26 opens and consequently the solenoid circuit opens for preventing the energization of the solenoid 10 when not required and also for preventing waste from electricity of electric source 13. Instead of the other switch 26 being in the form of a switch which operates in response to the insertion or withdrawal of a key into or from a rotor, as shown in FIG. 5, it might be a switch which is operable in response to the movement of a driver opens when he leaves the vehicle. Such a switch includes, for example, a switch provided on a driver's seat and operable in response to a pressure exerted thereupon, or a switch which is normally closed and is opened by the manual operation by a driver of a part of the vehicle, such as a hand brake, the manipulation of which is always likely when the driver leaves the vehicle.

Although the explanation and illustration of the present devices are made in conjunction with the anti-theft device attached to the steering shaft, it is to be noted that such anti-theft device may also include ones to be used in conjunction with other vital parts of a motor vehicle, such as brakes or transmission, for blocking same.

What is claimed is:

1. A device for preventing accidental operation of theft preventative apparatus in a motor vehicle of the type having a lock, a key removably insertable into a rotor in said lock, contact means for setting an electric circuit of the vehicle selectively in various positions, such as stop, drive and start positions in response to the rotation of said key and rotor into respective corresponding positions, and a locking bolt operable to engage a lockable part of the vehicle only upon the rotation of said key to its stop position and the withdrawal of said key from the rotor, which comprises
   releasable lock preventing means,
   means normally urging said lock preventing means during running of said vehicle into engagement with the key for preventing withdrawal of said key from the rotor when said rotor is in stop position, and
   means operable, when the vehicle halts, to release said lock preventing means from its engagement with the key,
   said release means being electrically actuated in response to the halting of a part of the vehicle which moves when the vehicle is in motion.

2. A device as claimed in claim 1, including switch means operative in response to the withdrawal of the key from said rotor to deactuate said release means to allow return of said lock preventing means to its normal position where it is engageable with the key upon reinsertion thereof into the rotor.

3. A device as claimed in claim 1, including switch means operative in response to the departure of a driver from the vehicle to deactuate said release means to allow return of said lock preventing means to its normal position where it is engageable with the key upon reinsertion thereof into the rotor.

4. A device for preventing accidental operation of theft preventive apparatus in a motor vehicle of the type having contact means for setting the electric ignition circuit of the vehicle in various positions such as stop, drive or start positions upon the rotation into corresponding positions of the rotor of a lock, which forms part of the above-mentioned apparatus, by a key removably inserted into the rotor, and means for controlling a locking bolt that is engageable with a lockable part of the vehicle only upon the rotation of said key to the stop position and the withdrawal of the key from the rotor, which comprises
   means normally releasably engaging said controlling means during running of the vehicle to prevent the locking bolt from engaging said lockable part of the vehicle, and
   means operable, when the vehicle halts, to release said bolt from engagement with said controlling means for allowing the bolt to engage said lockable part when said key is withdrawn, said release means being connected to be electrically actuated automatically in response to the halting of a part of the vehicle which moves when the vehicle is in motion.

5. A device as claimed in claim 4, in which said locking bolt normally directly engages said controlling means.

6. A device as claimed in claim 4, in which said locking bolt normally is not in direct engagement with said controlling means but is connected thereto through at least one intervening part.

7. A device as claimed in claim 4, which comprises a switch means operative in response to the withdrawal of the key from the rotor to deactuate said release means to allow return of said lock preventing means to its normal position where it is engageable with said controlling means upon reinsertion of said key in said rotor.

8. A device as claimed in claim 4, including switch means operative in response to the departure of a driver from the vehicle to deactuate said release means to allow return of said lock preventing means to its normal position where it is engageable with said controlling means upon reinsertion of said key in said rotor.

9. A device for preventing accidental operation of theft preventive apparatus in a motor vehicle of the type having contact means for setting an electric ignition circuit of the vehicle selectively in various positions such as stop, drive or start positions upon the rotation into similar positions of a key removably inserted into the rotor of a lock forming part of the above-mentioned apparatus, and means for controlling a locking bolt that is engageable with a lockable part of the vehicle upon rotation of said key to said stop position, which comprises
   lock preventing means normally urged releasably to engage directly with said locking bolt for holding said bolt in its inoperative position, and
   means operable to release said lock preventing means from engagement with the bolt so as to allow the bolt to project from its inoperative to its operative position towards said lockable part,
   said release means being electrically actuated automatically in response to the halting of a part of the vehicle which moves when the vehicle is in motion.

10. A device as claimed in claim 9, which comprises switch means operative in response to the withdrawal of the key from the rotor to deactuate said release means to allow return of said lock preventing means to its normal position where it contacts said locking bolt.

11. A device as claimed in claim 9, which comprises switch means operative in response to the departure of a driver from the vehicle to deactuate said release means to allow return of said lock preventing means to its normal inoperative position where it contacts with the locking bolt.

* * * * *